Aug. 30, 1938.    R. P. RASMUSSEN    2,128,595
CONVEYER
Filed July 24, 1936    2 Sheets-Sheet 1

Witness:
Harry R. L. White

Inventor:
Robert P. Rasmussen
By Edward Jay Wilson
Atty.

Aug. 30, 1938.  R. P. RASMUSSEN  2,128,595
CONVEYER
Filed July 24, 1936  2 Sheets-Sheet 2
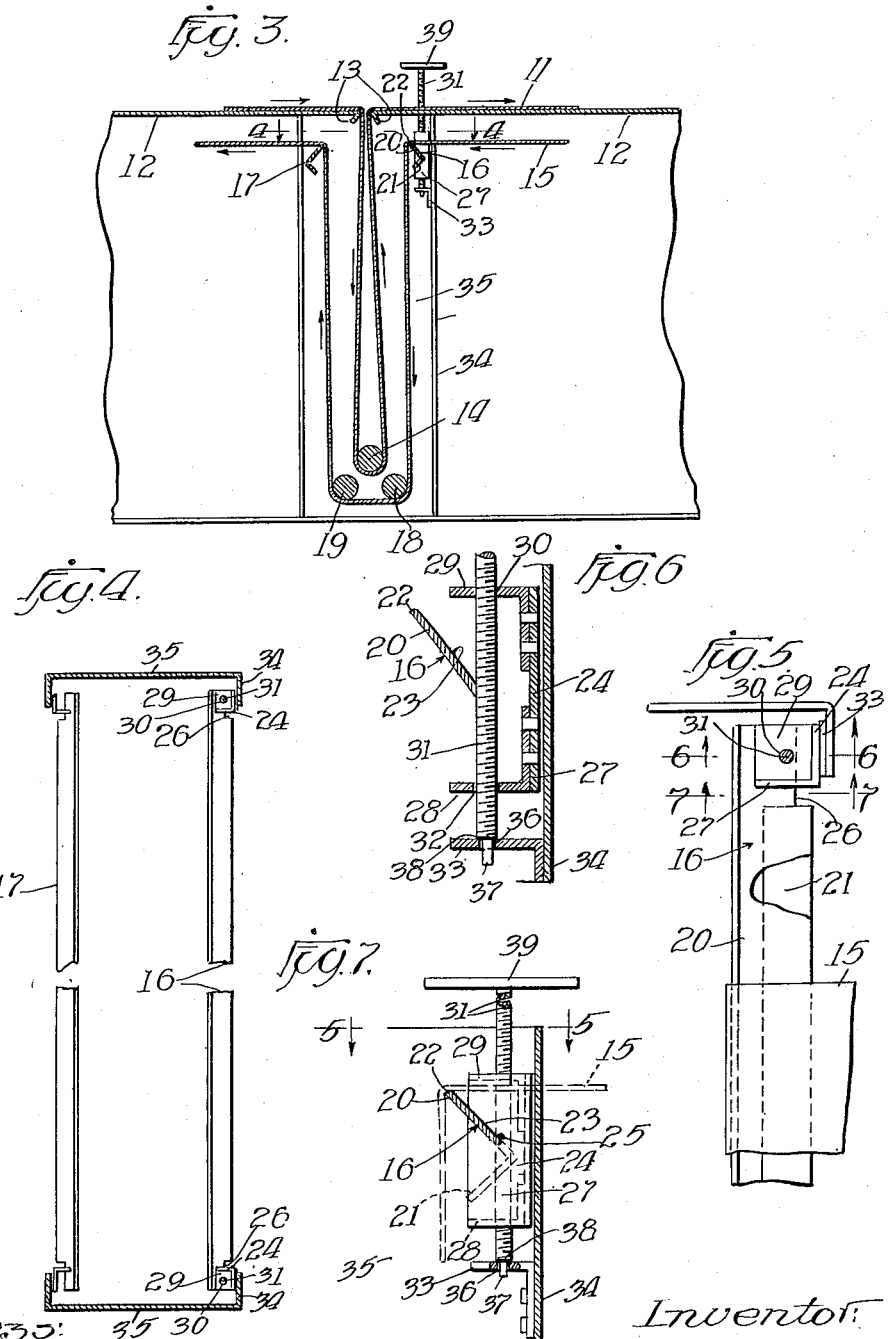
Witness:
Harry R. L. White
Inventor.
Robert P. Rasmussen,
By Edward Jay Wilson
Atty.

Patented Aug. 30, 1938

2,128,595

UNITED STATES PATENT OFFICE 2,128,595

CONVEYER

Robert P. Rasmussen, Chicago, Ill.

Application July 24, 1936, Serial No. 92,347

3 Claims. (Cl. 198—184)

This invention relates to improvements in conveyers of the belt type and has especial reference to relatively wide flat conveyer belts made of fabric and such as are used in the manufacture of candy, cookies and the like and particularly such belts which are arranged or installed for turning corners.

It frequently happens that conveyer belts for candy and other factories necessitate such long runs, for cooling and other purposes, that it is necessary to arrange the belt to turn a corner usually of 90 degrees and so arranged as to maintain the articles carried by the belt in upright position as they pass the corner. A mechanism for such a purpose is disclosed in my copending application filed May 24, 1935, Serial No. 23,229. In the use of such belts in the process of making candy, cookies or cakes, the top surface of the belt frequently carries more or less sticky substances, such as sugar drip from candies, etc., and as these belts are endless the lower or return stretch is frequently supported on guides or members with which the top surface of the belt contacts, this is particularly the situation where the belt is arranged to turn a corner.

Roller guides have heretofore been used in such mechanisms with the detrimental result that the accumulations on the belt are transferred to the roller guides, necessitating frequent stops for cleaning, and such accumulations tend to hinder the true tracking of the belt as well as causing other objectionable results.

I have overcome these objectionable results by the provision, at such guiding points, of guides with relatively narrow edges, which as the belt is drawn over them, scrape the accumulations off of the belt and these guides with the relatively sharp edges do not accumulate or retain the accumulations but remain clean and thus do not disturb the true tracking of the belt.

Such belts are made of fabric which is more or less effected by changing weather conditions and it sometimes occurs that one edge portion of the belt will stretch to some extent more than the other edge and I make these scraping guides adjustable so that they can be slightly tipped or inclined in relation to the transverse level of the belt to compensate for such stretching and cause the belt to track correctly.

The invention will be more readily understood by reference to the accompanying drawings, forming part of this specification, and the following description taken in conjunction with the appended claims.

In said drawings:—

Fig. 3 is a fragmentary vertical section at a right angle to Fig. 2 and taken on the line 3—3 of Figs. 1 and 2;

Fig. 4 is a fragmentary horizontal section on the line 4—4 of Fig. 3, the conveyer belt not being shown;

Fig. 5 is an enlarged view similar to Fig. 4, for better illustrating the guide and its adjustable support and taken on the line 5—5 of Fig. 7; and Figs. 6 and 7 are fragmentary, vertical sections on the lines 6—6 and 7—7 respectively of Fig. 5.

Figure 1:
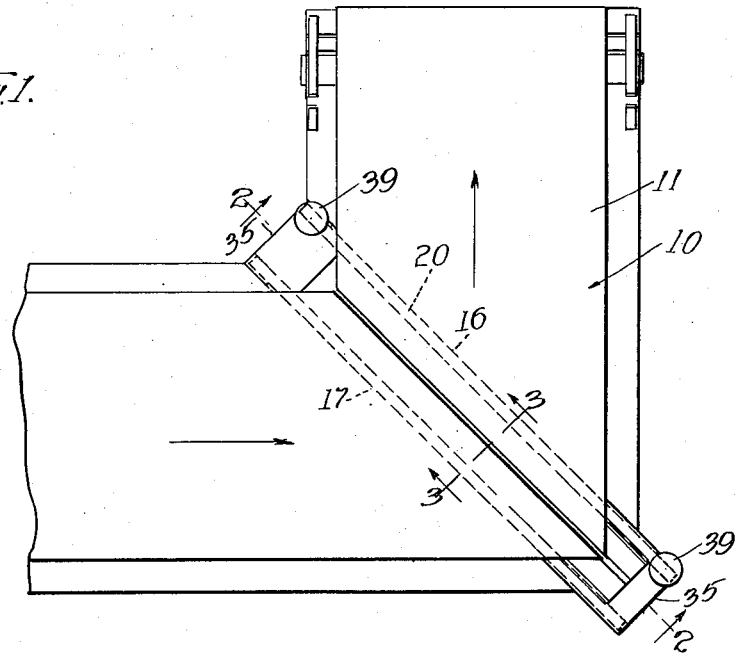
Fig. 1 is a fragmentary top plan view of a corner turn conveyer and embodying the invention in one form.
Figure 2:
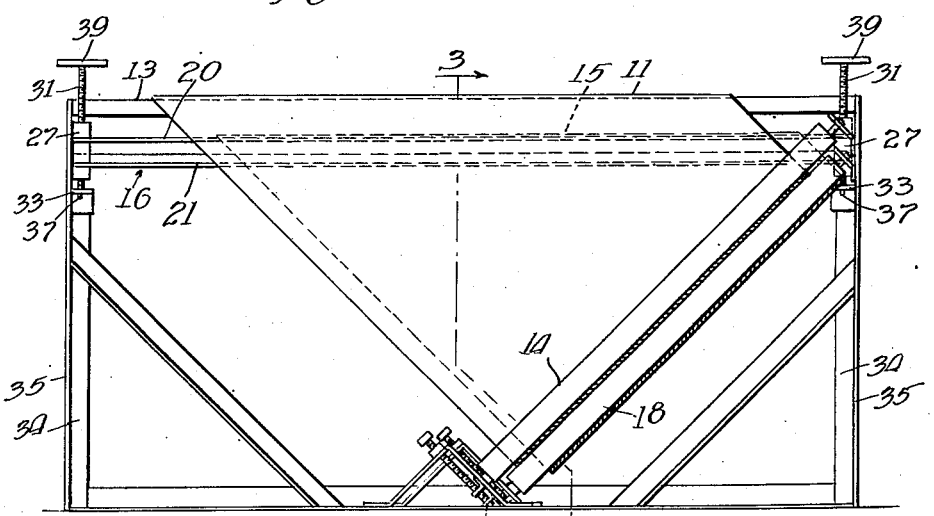
Fig. 2 is a fragmentary vertical section on the line 2—2 of Fig. 1.

For purposes of illustration I have shown a relatively wide flat belt 10 the top stretch 11 of which is arranged to travel in the direction of the arrows on Fig. 1 and to turn a corner as shown of substantially ninety degrees.

As best shown in Fig. 3, the top stretch 11 upon which the articles conveyed are supported, is supported on horizontal plate guide members 12 and at the junction of the two angularly disposed portions the adjacent edges of the supporting plates 12 are bent down to form guides 13 around which the belt is guided out of and back into the normal plane of the belt.

A suitably inclined guide roller 14 is arranged below the adjacent angular guide edges 13 to take up the slack as the conveyer turns the corner.

At the outer ends of the conveyer suitable guide rollers, not shown, are provided around which the conveyer is trained to return it beneath the top stretch 11.

The bottom stretch 15 of the conveyer is arranged beneath the top stretch and likewise is arranged to turn the corner. For causing the bottom stretch to turn the corner, I provide first a guide member 16 which is arranged substantially horizontally below the top stretch and adjacent to and substantially parallel with one of the top guide edges 13. A similar angular guide 17 is arranged at the opposite side of the angular turn of the conveyer and suitable roller guides 18 and 19 are provided below and around which the conveyer is trained to take up the slack at the turn.

As shown the guides 16 and 17 are inclined in a horizontal plane and the guide rollers 18 and 19 as well as the guide roller 14 are all inclined in vertical planes.

The improvement relates especially to the guide members 16 and 17 and particularly to the guide member 16 with which the conveyer first contacts on its return stretch. This guide member 16, as shown, is preferably, for convenience, made of an angle member of usual form having two legs 20 and 21. Preferably these legs extend at a right angle to each other and the leg 20, is wider than the leg 21.

As shown the angle member guide 16 is set at an angle of substantially 45 degrees to the line of travel of the belt so that the free edge 22 of the leg 20 will form a free edge around which the return stretch 15 of the conveyer is guided downwardly out of the horizontal path of the conveyer.

Preferably this leg 20, as shown, bisects the angle through which the conveyer turns around same. The leg 20 is relatively thin and as the conveyor is drawn around or across same no accumulations can lodge or stick to same but accumulations on the conveyer are scraped off and slide down the inclined surface 23 of the guide and are thus removed. The lower leg 21 of the guide is narrower than the upper leg and thus does not touch the belt as the belt passes same.

As explained herein the conveyer belt, being effected as to tension, more or less by changes in the weather, I so mount the guide 16 that it can be inclined slightly out of a horizontal plane to cause the return stretch of the conveyer to be guided correctly in its desired path.

Preferably the mounting of the guide 16 comprises metal angle members 24 one at each end of the guide 16 and each of which has a downwardly inclined slot 25 in its side toward the corner turn of the belt which is adapted to receive the leg 20 of the guide 16, the lower leg 21 of the guide being cut away near each end as shown at 26 so as not to interfere with this method of mounting.

The members 24 are each made up of a piece of angle iron 27 extending vertically and smaller angle pieces 28 and 29 secured rigidly within the angle member 27 at the lower and upper ends respectively thereof with one leg of each extending horizontally within the angle 26. The upper small angle 29 has a vertically extending screw-threaded hole 30 to receive a vertical adjusting screw 31 and the lower small angle 28 has a similar opening 32 through which the screw freely passes and by which the member 27 is guided as it is moved up or down. For supporting the adjusting means described a piece of angle iron 33 is rigidly secured to a flange 34 of a channel member 35 which forms part of the frame of the conveyer and is provided with a hole 36 to receive the point 37 of the screw, from which the screw threads have been removed, and which provides a shoulder 38 on the screw for contact with the angle member 33 for supporting the screw.

The screw and the parts attached thereto are held from rising by gravity and the pull of the conveyer belt. The member 27 is prevented from turning by contact with the channel member 35.

The screw 31 preferably rises above the conveyer and is provided with a hand wheel 39 secured to its upper end for convenience in adjusting the guide 16.

By means of the structure described the attendant can readily adjust the ends of the guide 16 vertically and can watch the conveyer as he does so to cause the conveyer to track correctly.

The guide 17 is similar to the guide 16, except that it is rigidly mounted, as it is not necessary to adjust this one.

It is obvious that in a conveyer structure which does not include an angle turn but in which the upper and lower stretches extend in a straight line, the lower return stretch could be guided down out of its normal path around such a scraper guide as has been described and it would perform a similar function of scraping and guiding the conveyer as in the form already described.

As many modifications of the invention will readily suggest themselves to one skilled in the art I do not limit or confine the invention to the specific details of construction here shown and described except within the scope of the appended claims.

I claim:—

1. In a substantially flat belt conveyer system having a continuous conveyer belt and having two parts extending at an angle to each other, the top or active portion of the conveyer belt extending from end to end of the conveyer and the return or under portion of the conveyer belt also extending from end to end of the conveyer and arranged substantially vertically beneath the upper portion throughout the length thereof, angularly disposed thin edged guide members arranged at the adjacent ends of the two parts of the active part of the conveyer belt, said guides being close together and parallel with each other and by which the conveyer belt is guided out of and into the plane of the conveyer, and guide means beneath said parallel guides for taking up the slack of the top or active conveyer belt at the turn, and similar angularly disposed thin edged guides, arranged at the turn for the under or return portion of the conveyer belt, one at each side of the turn, and arranged substantially parallel with each other, and other guide means below said similar angular guides for taking up the slack in the under portion of the conveyer belt at the turn.

2. In a substantially horizontal flat conveyer system, an endless conveyer belt divided into two active sections extending at an angle to each other and in substantially the same plane and two return sections arranged respectively substantially beneath the active sections, a pair of thin edged angularly disposed guides arranged at the adjacent ends of the active sections parallel with each other and close together, around which the active sections are respectively guided out of and into the plane of said active sections, a second pair of thin edged angularly disposed guides parallel with each other and arranged beneath the active sections and adjacent to the adjacent ends of said active sections around which the return sections are guided and other guide means associated respectively with said two pairs of angularly disposed guides for maintaining the sections of said conveyer system in taut condition across their width at the angle turn.

3. In a conveying apparatus, the combination of an endless conveyer belt having an upper active portion and a lower inactive portion, means for driving said belt, means for guiding the upper active portion of said belt to provide adjacent work supporting runs thereof lying at an angle to each other, the discharge end of the first run and the receiving end of the second run being located in approximately the same plane and close together and connected by a downwardly extending loop, said guiding means including means holding said loop taut and disposed angularly both with reference to the direction of travel of said runs and also with reference to the plane of said runs, and similar means for guiding the lower return portion of the conveyer belt to provide runs thereof extending beneath the runs of the active portion thereof and disposed at a similar angle to each other, and also connected by a downwardly extending loop, said guiding means for said lower portion including relatively thin edged guides arranged angularly in relation to the direction of travel of said runs and adapted to guide the belt downwardly out of the plane of said runs and upwardly into the plane of said runs and also including other guide means disposed angularly with respect to the plane of said runs and also with respect to the direction of travel of said runs for holding said lower loop taut.

ROBERT P. RASMUSSEN.